June 14, 1960  R. S. BINFORD  2,940,461
PROPORTIONAL FLUID FLOW MEASUREMENT AND CONTROL SYSTEM
Filed April 13, 1954  2 Sheets-Sheet 1

Inventor:
Robert S. Binford,
by Claude S. Mott
His Attorney.

June 14, 1960 R. S. BINFORD 2,940,461
PROPORTIONAL FLUID FLOW MEASUREMENT AND CONTROL SYSTEM
Filed April 13, 1954 2 Sheets-Sheet 2
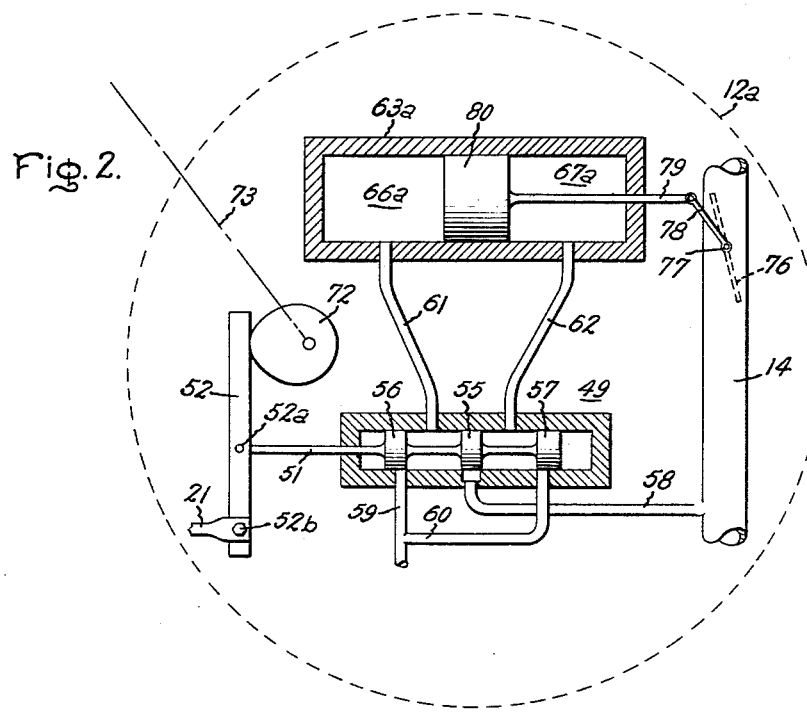
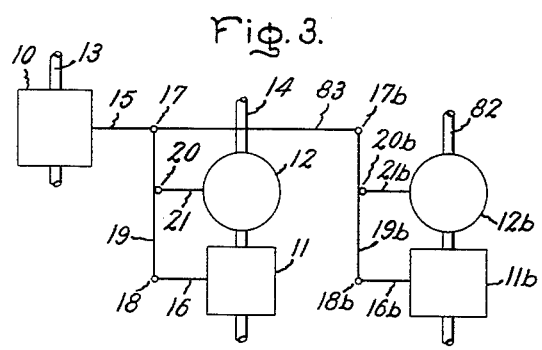
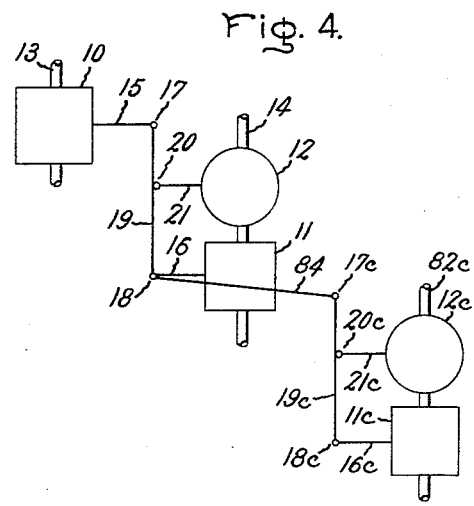
Inventor:
Robert S. Binford,
by *Claude S. ....*
His Attorney.

2,940,461

PROPORTIONAL FLUID FLOW MEASUREMENT AND CONTROL SYSTEM

Robert S. Binford, Schenectady, N.Y., assignor to General Electric Company, a corporation of New York Filed Apr. 13, 1954, Ser. No. 422,778

1 Claim. (Cl. 137—100)

This invention relates primarily to proportional liquid flow control systems and more particularly to systems for controlling and maintaining precise proportional relationships between two or more liquid flow rates within separate liquid transmission conduits.

Previously, when a precise control of the proportional rates of flow in two conduits has been required it has frequently been necessary to employ a human operator to observe the indications of flow measuring instruments and to adjust manually operated valves in order to maintain the desired flows. If unattended automatic operation was desired, an inaccurate approximation of the proportional relationship generally had to suffice by reliance upon fixed settings of the flow control valves.

Accordingly it is one object of this invention to provide a simple, accurate, and inexpensive proportional flow control system with a continuous adjustment of proportionality.

Another object of the present invention is to provide a very accurate proportional control apparatus which is also very rugged, and having a high control power.

Another object of the invention is to provide a continuously operable proportional flow control system which has a very fast rate of control response and which does not require any source of power other than the mechanical energy in the flowing liquids which are being measured and controlled.

Other objects and advantages of this invention will be apparent from the following description and the accompanying drawings.

In carrying out the objects of this invention, in one preferred embodiment, there may be employed a plurality of liquid flow measurement devices having a mechanical flow position indicating output. One of these flow measurement devices is employed to measure the flow through each of the liquid conduits or transmission lines as to which a flow proporitonality is to be maintained. A differerential device is provided to indicate proportionate differences in the output positions from the flow measurement devices between which proportionality is to be maintained and flow control apparatus is provided to vary the flow through one of the associated conduits to maintain the desired flow proportionality in response to signals from the differential device.

For a more complete understanding of the invention, reference should be made to the following description and the accompanying drawings as follows:

Fig. 2 is a schematic diagram of an alternative liquid flow control apparatus which may be employed in the system of Fig. 1.

Figure 1:
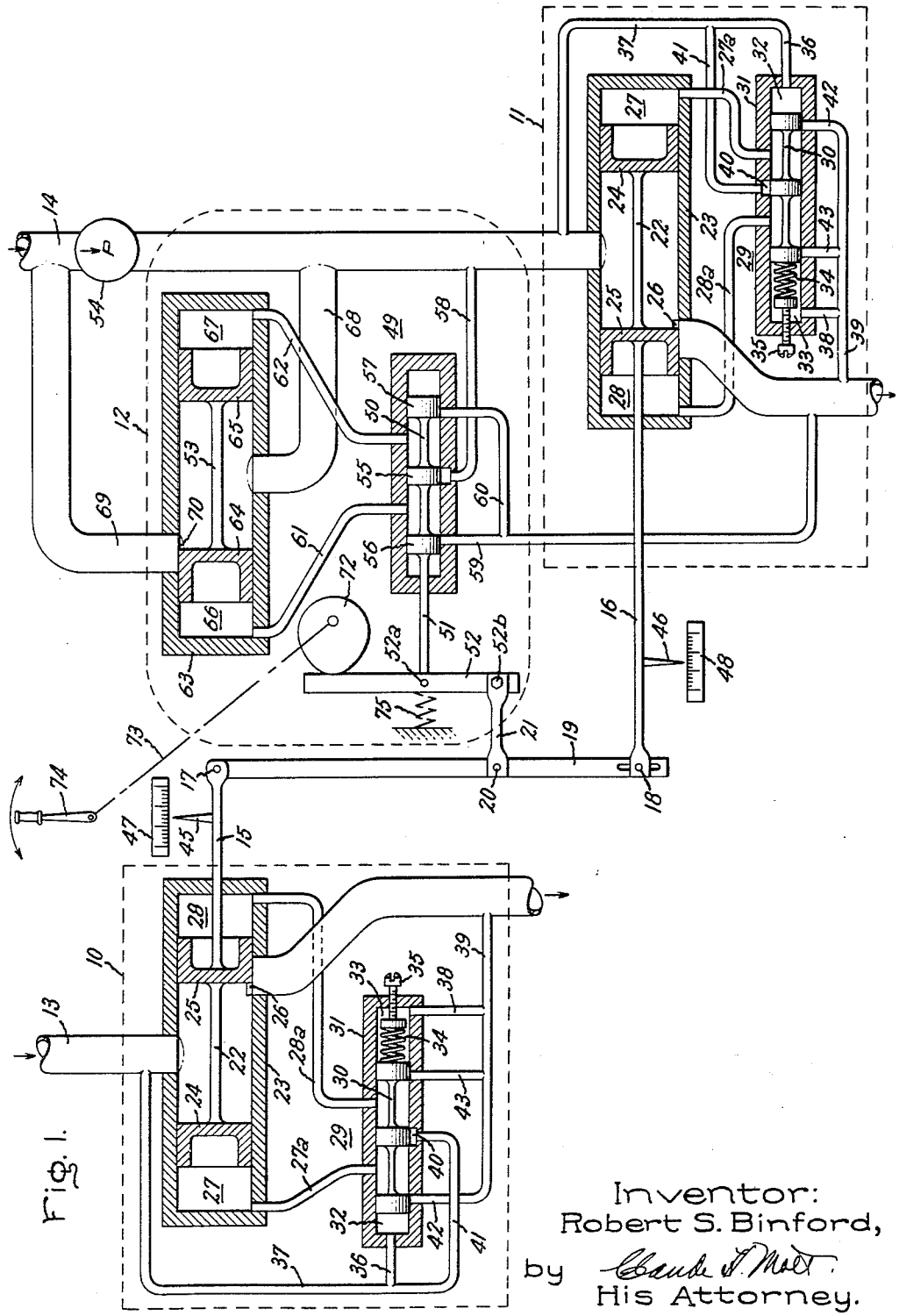
Fig. 1 is a schematic diagram of one embodiment of the system of this invention.

And Figs. 3 and 4 are simplified schematic diagrams of alternative embodiments for maintaining proportional control of the flows in three separate liquid transmission lines.

In Fig. 1, the system shown consists of similar liquid flow measurement devices 10 and 11 and a liquid flow control apparatus generally indicated at 12. Measurement devices 10 and 11 respectively measure the liquid flow rates through liquid transmission lines or conduits 13 and 14 and the flow control apparatus 12 controls the rate of flow through line 14 as will be described more fully below, in response to the measurements from the devices 10 and 11. Devices 10 and 11 include reciprocable output connecting rods respectively designated at 15 and 16, the reciprocatory position of which indicates the flow measured. The connecting rods 15 and 16 include respective pivotal connections 17 and 18 to a differential device such as a lever 19. The lever 19 includes an intermediate pivot connection at 20 to a third connecting rod 21 which provides an input signal to the flow control apparatus 12.

If there are changes in the rates of flow within the liquid transmission lines 13 and 14 which do not cause a deviation from the desired flow change proportionally, the pivot 20 of lever 19 will remain substantially stationary, having no horizontal movement, while the changes in flow rate measured by devices 10 and 11 will cause a rotation of the lever 19 about the pivot 20. However, if the flow rate within one of the transmission lines 13 or 14 changes independently or disproportionately with respect to the other, a horizontal displacement of the pivot 20 will result and an error signal is fed through the connecting rod 21 to the flow control apparatus 12 to change the flow through line 14 to re-establish the desired proportionality.

The flow measurement devices 10 and 11 may be of any structure which provides a mechanical output position signal to indicate flow rate. However, I prefer to employ the flow measurement device structure which is described and claimed for instance in my copending patent application Serial No. 341,305 entitled "Fluid Flow Measurement and Control Apparatus," filed March 9, 1953, and assigned to the same assignee as the present application, now Patent No. 2,889,780. Flow measurement devices 10 and 11 are shown in Fig. 1 as embodying that structure. Since the structure is substantially identical in both devices, for purposes of clarity, like reference numerals have been used for like parts. Each employs a piston 22 which may be formed integrally with the output connecting rods 15 or 16. The piston 22 is reciprocable within a housing 23 and includes two valve lands 24 and 25. Reciprocal movement of piston 22 causes a variation in the opening of a port 26 in the housing 23 by the valve land 25. The port 26 preferably has a rectangular shape so that the port area is a direct linear function of the position of the piston 22. The end lands 24 and 25 each form control pressure chambers 27 and 28 with the associated closed end portions of the housing 23. The fluid pressures within the control pressure chambers 27 and 28 are controlled by a pilot valve 29 having a three-land piston 30 reciprocably mounted within a housing 31. The end lands of the pilot valve piston 30 also define control pressure chambers 32 and 33 with the respective closed ends of the pilot valve housing.

Within chamber 33 a compression spring 34 is provided to bias the piston 30 with a bias pressure which may be adjusted by means of a set screw 35. The chamber 32 is connected by means of control pressure conduits 36 and 37 to the input side of the associated liquid transmission line 13 or 14 and the chamber 33 is connected by means of conduits 38 and 39 to the discharge side of the associated transmission line. Thus, the pilot valve piston 30 is positioned by a balance of forces between the input pressure in chamber 32 against a combination of the output pressure in chamber 33 plus the force of spring 34. Therefore, for a given setting of the adjusting screw 35, there is only one pressure difference between the input and the output sides of the flow measurement device 10 or 11 which will result in the neutral or null position of the pilot valve piston 30 shown in the drawing.

Since the center land of piston 30 cooperates with a port 40 which is connected by means of conduit 41 and the conduit 37 to the inlet pressure side of the associated transmission line, and the ports cooperating with the end lands of the piston 30 are connected by branch conduits 42 and 43 through conduit 39 to the discharge side of the associated transmission line, movement of the pilot piston 30 away from the central position shown causes a conveyance of pressure liquid from the center port 40 through one of the conduits 27a or 28a to one of the end chambers 27 or 28 to cause a movement of the piston 22. Thus, for instance, if the pressure drop across the flow measurement device decreases, the piston 30 moves away from the spring 34 to cause a transmission of pressure fluid from the pilot valve port 40 through the conduit 28a to chamber 28 to thus partially close the port 26 by movement of the piston 22 in a direction to partially withdraw the associated connecting rod 15 or 16 into the casing 23. This reduction in the orifice at 26 causes an increase in pressure drop in the flow measuring device, thus causing a return of the pilot valve 30 to the neutral or null position shown in the drawing. The original movement of pilot valve 30 also causes a connection between the port associated with conduit 42 through the pilot valve housing to the conduit 27a to cause an exhaustion of the control pressure chamber 27 concurrent with the increase in the pressure within the control pressure chamber 28.

It will be understood that an increase in the pressure drop across the flow measurement device will result in movements of both the pilot valve 30 and the main valve 22 opposite to those just described to cause a greater orifice opening at 26 to extend the associated connecting rod 15 or 16. In this way, a constant pressure drop is maintained across the orifice 26 by the operation of pilot valve 29. This flow measurement device thus makes use of the principle that the rate of liquid flow is proportional to the area of an orifice through which the liquid flows, if the pressure across that orifice is maintained at a constant value. The position of the piston 22 and therefore of the connecting rod 15 or 16 is therefore a direct function of the rate of liquid flow through the associated liquid transmission line 13 or 14. Flow measurement devices 10 and 11 are shown as identical in structure except that device 11 is a "left-hand" version in order to obtain correct operation of the system. As mentioned above, the specific flow measurement device structure just described, comprises a portion of the material disclosed and claimed in my prior patent application Serial No. 341,305, now Patent No. 2,889,780.

From the above description it will be apparent that the horizontal position of either the connecting rod 15 or 16 indicates the flow measurement provided by the associated flow measurement device 10 and 11. For a visual indication of these measurements, pointers 45 and 46 may be provided to directly indicate flow rates on associated scales 47 and 48.

As explained above, the operation of this system to obtain an adjustment of the proportionality of flows in the two lines 13 and 14 by adjustment of the flow control device 12 depends upon a shift in the horizontal position of the pivot 20 and the connecting rod 21 in either direction from the position shown in the drawing. In other words, the flow control device 12 must be of the "null centering" type in which the control input signal returns to the centered position upon attainment of the desired output condition regardless of the controlled output of the device. This control operation is obtained in the flow control device 12 shown in Fig. 1 by means of a pilot valve 49 having a piston 50 which is positioned through an integral connecting rod 51 and a lever 52 by the input connecting rod 21. The lever 52 is pivotally connected to the connecting rods 51 and 21 by the respective pivots 52a and 52b. Upon displacement of the pilot piston 50 from the central null position shown, by a corresponding movement of the connecting rod 21, a control operation is accomplished in which a bypass valve piston 53 is caused to move to change the flow of liquid through a bypass connection around a pump 54 which is pumping the liquid through line 14, as will be more fully described below.

The pilot valve piston 50 includes a center land 55 and end lands 56 and 57. A port in the pilot valve housing which cooperates with center land 55 is supplied with high pressure liquid through a conduit 58 from the high pressure side of flow measurement device 11. Similarly, ports positioned for cooperation with the end lands are connected through conduits 59 and 60 to the low pressure side of flow measurement device 11.

Pilot valve 49 is also provided with output control conduits 61 and 62 which are connected to the respective ends of a housing 63 surrounding and supporting the bypass valve piston 53. The piston 53 includes end lands 64 and 65 which respectively form control pressure chambers 66 and 67 with the associated ends of the housing 63 to which the conduits 61 and 62 are connected. A bypass line 68 is connected from the transmission line 14 on the high pressure side of the pump 54 to the central portion of the bore of housing 63 and a bypass liquid connection around the pump 54 is completed by a conduit 69 which relieves the central bore of housing 63 through a discharge port 70, the area of which is varied by movement of the associated valve land 64.

The over-all operation of the entire system disclosed in Fig. 1 may be typically described as follows: if the liquid flow in line 13 increases, the increased flow measurement resulting from the momentarily increased pressure drop across the orifice 26 will cause an outward movement, to the right in the diagram, of the connecting rod 15. The lever 19 will thus be caused to pivot to the right, about the lower pivot 18 causing a horizontal movement of connecting rod 21 and flow control pilot valve 50 to the right. This results in a connection of high pressure liquid from the center port conduit 58 through the control conduit 61 to the control pressure chamber 66. A concurrent connection is established from the control pressure chamber 67 through the control conduit 62 past the end land 57 of the pilot valve to the low pressure conduit 60. The resulting increase in the control pressure within chamber 66 and decrease in the pressure within chamber 67 causes a movement of bypass piston 53 to the right in the diagram, thus partially closing the bypass orifice 70. The resulting decrease in liquid flow through the pump bypass circuit results in a higher pressure within the line 14 and a higher flow rate through the flow measuring device 11. As the flow measurement device 11 measures the higher flow, an outward movement of connecting rod 16 results, causing a leftward pivotal movement of the lever 19 about the upper pivot 17 to restore the connecting rod 21 to the original centered position shown. No further flow correction will then be made.

A manual correction or adjustment may be made in the relative quantities of liquid which are permitted to flow through the lines 13 and 14 by means of a cam 72 which may be rotated by means of a shaft schematically shown at 73 from a suitable manually positionable lever 74. The cam 72 controls the angular position of lever 52 about its center pivot 52a for the centered or null position of the flow control pilot valve 50. Thus, the position of the cam 72 will determine the horizontal position of the flow control connecting rod 21 at which no correction of the flow control device 12 is required and this position may be varied at will. A cam follower spring 75 is preferably provided in order to assure that the lever 52 will follow the cam 72. It will be understood of course that an input signal other than manual may be caused to rotate the cam shaft 73 and the cam 72 so as to vary the liquid flow proportionality automatically for instance in accordance with the operation of a larger system into which the present system may be incorporated.

Although the basic difference in the rates of flow in the two lines 13 and 14 may be varied by the adjustment of cam 72, as described above, it will be understood that the proportionality of changes in flow maintained by the system will be determined by the ratio of the respective distances from the connecting rod pivots 17 and 18 to the intermediate pivot 20. Minor adjustments of the proportionality of changes in flow may be obtained therefore by vertical adjustment of the position of pivot 20 on the differential lever 19. The initial position of the pivot 20 is chosen in accordance with the proportionality requirements for which the system is designed.

It will be understood, of course, that the cam 72 and the lever 52 may be entirely eliminated if the adjustment provided thereby is unnecessary. The connecting rods 21 and 51 could then be made integrally or the pivots 52b and 52a could be made to coincide.

Other alternative flow control devices of the null centering type may be employed in place of the device 12 disclosed in Fig. 1. For instance, in Fig. 2 an alternative flow control device 12a is disclosed employing a butterfly valve 76 to control the flow of liquid through line 14. This butterfly valve 76 may be pivotally mounted at 77 for operation by rotation of a crank member 78 by motion transmitted through a connecting rod 79 from a power piston 80. Power piston 80 is operated in the same manner as the bypass valve piston 53 of Fig. 1 under the control of the pilot valve 49.

It will be apparent from the above description that the apparatus of this invention provides a simple, continuous, automatic proportionality control of the rates of flow of liquids through liquid transmission lines. It will be apparent that more complicated proportional flow control systems may be constructed from this basic system for controlling flow proportions within larger numbers of liquid transmission lines. Typical examples of systems to control proportional flows in three liquid transmission lines are shown in the simplified schematic diagrams of Figs. 3 and 4. In these diagrams, the flow measurement devices are schematically shown as square boxes, and the flow control devices as circular boxes.

Fig. 3 employs the system of Fig. 1, but in addition the flow in the third liquid transmission line 82 is controlled with respect to the flow in the first line 13 by means of an additional connecting rod 83 horizontally positioned in accordance with the flow measurement of device 10. This flow control measurement is combined with a third flow control measurement from a flow measurement device 11b, corresponding to device 11, to maintain the flow in line 82 in a desired proportion to the flow in line 13 through control of a second flow control device 12b corresponding to flow control device 12. Thus, the flows in both lines 14 and 82 are maintained in desired proportions with relation to the flow in line 13.

Alternatively, the flow in the third line may be controlled as shown in Fig. 4 in accordance with the flow in the second transmission line 14. For this purpose, a flow measurement may be taken through an additional connecting rod 84 from measurement device 11. The flow in the third line 82c in Fig. 4 may thereby be made to depend directly upon the flow in line 14 by means of the third line flow measuring device 11c and control device 12c. It will be observed however that even in Fig. 4 the measurement of the primary flow rate in line 13 determines and controls the other flow rates. The connection for the control in the third line 82c is from the connecting rod 84, through the lever 19.

Proportional control systems for more than three liquid transmission lines may be devised in accordance with the above teachings of this invention and numerous variations in the proportionality connections may be used. It will be understood, of course, that the direct proportionality control connections will be established between the lines in which the proportionality is most critical, in order to obtain the maximum accuracy of control operation where it is most required. In each case, however, all flow rates will be controlled, at least indirectly, in accordance with the flow in a primary transmission line such as line 13 in the drawings.

The following claim is intended to define the valid scope of this invention over the prior art and to cover all changes and modifications falling within the true spirit and valid scope of the invention.

What I claim as new and desire to secure by Letters Patent of the United States is:

A proportional flow control apparatus comprising flow measurement devices respectively arranged to measure a flow rate in first and second liquid transmission lines, each of said devices including reciprocable output members positionable in accordance with a function of the flow rate to be measured, a lever pivotally connected between said output members, a hydraulic pilot valve connected by means including an independent pivot to said lever at a point corresponding to a desired proportionality of flows in said transmission lines, a pump connected to provide liquid flow in said second liquid transmission line, a bypass valve connected for operation in rseponse to movement of said pilot valve away from a centered position and connected to by-pass said pump to control the flow of liquid through said second transmission line.

References Cited in the file of this patent

UNITED STATES PATENTS

| | | |
|---|---|---|
| 1,435,846 | Hogg | Nov. 14, 1922 |
| 1,972,853 | Johnson | Sept. 11, 1934 |
| 2,024,479 | Short | Dec. 17, 1935 |
| 2,058,889 | Jones | Oct. 27, 1936 |
| 2,074,883 | Ziebolz et al. | Mar. 23, 1937 |
| 2,143,820 | Payn | Jan. 10, 1939 |
| 2,352,584 | Ziebolz et al. | June 27, 1944 |
| 2,410,335 | Burdick | Oct. 29, 1946 |
| 2,492,990 | Hanna | Jan. 3, 1950 |
| 2,538,824 | Andresen | Jan. 23, 1951 |
| 2,564,306 | Isreeli et al. | Aug. 14, 1951 |
| 2,632,459 | Yingst | Mar. 24, 1953 |
| 2,643,663 | Gold et al. | June 30, 1953 |
| 2,694,979 | Lauck | Nov. 23, 1954 |
| 2,723,675 | Longford | Nov. 15, 1955 |
| 2,763,279 | Godden et al. | Sept. 18, 1956 |
| 2,889,780 | Binford | June 9, 1959 |